V. P. Kimball,
Cheese Box.
No. 90,107. Patented May 18, 1869.
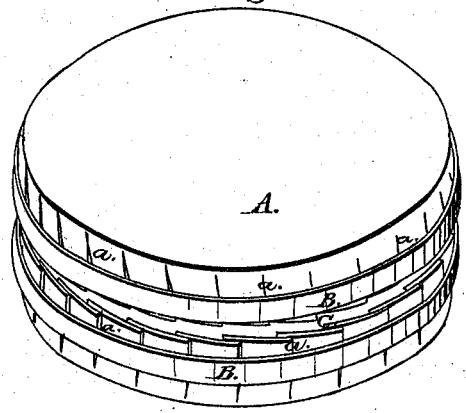
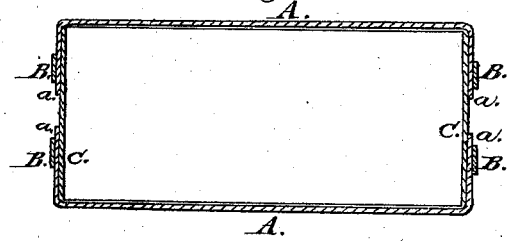
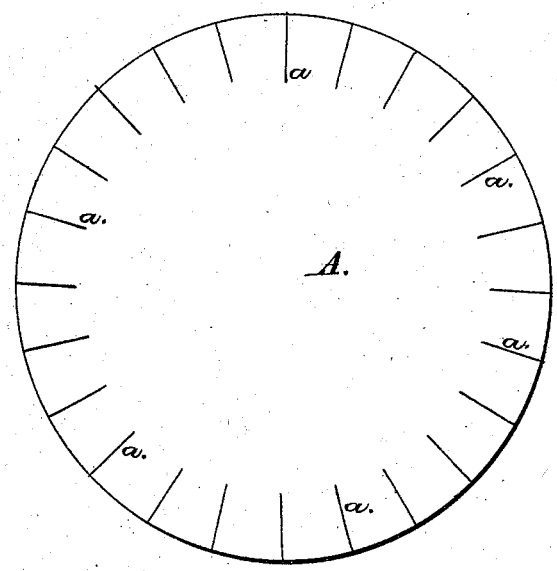
Witnesses:
A. Bailey
Wm. J. Mahee
Inventor:
V. P. Kimball
by A. Pollok
atty.

United States Patent Office.

V. P. KIMBALL, OF WATERTOWN, NEW YORK.

Letters Patent No. 90,107, dated May 18, 1869.

IMPROVEMENT IN CHEESE-BOXES.

The Schedule referred to in these Letters Patent and making part of the same.

*To whom it may concern:*

Be it known that I, V. P. KIMBALL, of Watertown in the county of Jefferson, and State of New York, have invented certain new and useful Improvements in Boxing Cheese; and I hereby declare the following to be a full, clear, and exact description of the same, reference being had to the accompanying drawings, and in which—

Figure 1 is a perspective view of a cheese boxed in accordance with my invention.

Figure 2 is a vertical central section through the box, or casing.

Figure 3 is a top view of the paper blank, which is applied to the top and bottom of the cheese, as hereinafter described.

My invention relates to the method of and means for boxing cheese for transportation; and Its object is to devise a way in which the casing, or box, can always be made to fit the cheese tightly, whatever may be the varying size of the latter; and also, to produce a box which shall be lighter, stronger in proportion to the amount of material employed, and cheaper, both as regards the cost of material and expense of manufacture, than has heretofore been the case. To this end, My invention may be stated to consist—

First, in forming the cover for the ends of the cheese of a disk of paper, the outer edge of which is bent down over the end of the cheese, and is there held in place by means of a metallic or other hoop, pressed down over the cover, so as to encircle the cheese, and to hold the bent edge of the cover upon the sides of the cheese.

Second, in the method of boxing cheese, by the employment of a paper strip, to encircle the sides of the cheese, which, after being placed upon the cheese, is secured by means of the bent edges and the encircling hoops of the paper covers, applied to the cheese-ends, as aforesaid.

The nature of my invention will be readily understood, by reference to the accompanying drawings.

In fig. 3 is represented the form in which I prefer to make the paper disks, or blanks, which, when applied to the cheese, constitute the covers for the ends of the same.

The disk, or blank, A, is of sufficiently greater diameter than the cheese to allow the necessary length at the outer edge to be turned down, so as to form the sides, or rim of the cover.

And this outer portion of the blank is provided with a series of slits, a, to facilitate the operation of bending down the edge; or this portion of the blank, instead of being slit, can be crimped for the same purpose.

When the end of the cheese is to be covered, the blank A is applied to the end, and then that portion of it which projects beyond the cheese is bent down over the edge, and so as to fit snugly around the sides of the latter.

The slits a render this operation easy, and allow the divided portions of the blank to overlap each other, as shown in fig. 1.

A hoop, B, of metal or other material, and of the proper size, is then pressed down, so as to tightly encircle the rim, and to hold the cover firmly in position upon the cheese, and the operation is completed without further trouble.

It will be noticed that the expense and trouble of box-making are thus completely avoided; and not only that, but the cover can be made invariably to fit the cheese snugly and accurately, the outer portion of the cover, which forms the rim, being bent down over and fitted to the cheese after the cover is applied to the end of the same.

In fig. 1, both ends of the cheese are represented as protected by covers; and in order to fully protect the sides of the cheese, without at the same time necessitating the formation of a box, in the ordinary sense of the term, I wrap around the cheese a loose strip, or band of paper, C, which, in width, should be equal to the thickness of the cheese, and should have a sufficient length to allow its loose ends to at least overlap, when the band is wound around the cheese.

The band is applied to the cheese first, and then the disks A are placed upon the ends, and their divided outer edges are pressed down over the sides, or edges of the band, and there held by the hoops C, so as to partially or wholly enclose the band, as shown in fig. 2, thus preventing all possibility of its becoming disengaged.

The cheese, by such simple, cheap, yet effective means, can be expeditiously boxed for transportation.

As the casing, from the manner in which it is applied, invariably fits the cheese snugly, no more room is taken up than is absolutely necessary, while at the same time it is, for the same reason, rendered stronger, more durable, and better able to resist the hard usage to which, at times, it is subjected.

With regard to the material of which the casing is composed, I prefer to use box-board, or straw-board, and like stock; but of course any kind of paper that the manufacturer prefers can be employed for the purpose.

The method of covering the ends of the cheese may be employed even where a loose side-wrapper, C, is not employed, but I prefer, however, to use the the three parts, viz, the loose band C, blanks A, and hoops B, in conjunction.

Having now described my invention, and the manner in which the same is or may be carried into effect,

What I claim, and desire to secure by Letters Patent, is—

1. Forming the cover for the cheese-ends of a paper disk, or blank, the outer, or projecting portion of which is bent down over the end and upon the sides of the cheese, and is there held, by means of a metallic or other hoop, applied to said cover and cheese, substantially in the manner and for the purposes set forth.

2. The method of boxing cheese by the employment of a paper strip, or band, to encircle the sides of the cheese, in combination with the covers for the ends, and the hoops for holding the same, constructed and applied substantially as herein shown and specified.

In testimony whereof, I have signed my name to this specification, before two subscribing witnesses.

V. P. KIMBALL.

Witnesses:
WM. H. KIMBALL,
J. H. CAMP.